US010921702B2

(12) United States Patent
Inoue et al.

(10) Patent No.: US 10,921,702 B2
(45) Date of Patent: Feb. 16, 2021

(54) ABNORMALITY DETECTION UNIT, PROJECTOR, ABNORMALITY DETECTION METHOD, AND RECORDING MEDIUM

(71) Applicant: CASIO COMPUTER CO., LTD., Tokyo (JP)

(72) Inventors: Akira Inoue, Tachikawa (JP); Tomoya Makino, Mitaka (JP); Koichi Kato, Tachikawa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 16/235,196

(22) Filed: Dec. 28, 2018

(65) Prior Publication Data

US 2019/0212641 A1    Jul. 11, 2019

(30) Foreign Application Priority Data

Jan. 9, 2018 (JP) .............................. JP2018-000930

(51) Int. Cl.
*G03B 21/20* (2006.01)
*H04N 9/31* (2006.01)

(52) U.S. Cl.
CPC ......... *G03B 21/206* (2013.01); *G03B 21/204* (2013.01); *G03B 21/2053* (2013.01);
(Continued)

(58) Field of Classification Search
CPC ................ G03B 21/206; G03B 21/204; G03B 21/2053; H04N 9/3197; H04N 9/3111;
(Continued)

(56) References Cited

U.S. PATENT DOCUMENTS

2009/0073592 A1   3/2009  Huang
2011/0043764 A1*  2/2011  Narikawa ............ G03B 21/204
                                                             353/31
(Continued)

FOREIGN PATENT DOCUMENTS

JP    2010-220150 A    9/2010
JP    2013-197807 A    9/2013
(Continued)

OTHER PUBLICATIONS

JPO; Application No. 2018-000930; Notice of Reasons for Refusal dated Aug. 21, 2020.
(Continued)

*Primary Examiner* — Michelle M Iacoletti
*Assistant Examiner* — Magda Cruz
(74) *Attorney, Agent, or Firm* — Fitch, Even, Tabin & Flannery LLP (57) ABSTRACT

An abnormality detection unit according to the invention includes a processor, and a light source device configured to emit light for each of segment periods that are time divided within a frame, and the processor obtains an illuminance value of light emitted into the frame from the light source device after a predetermined delay time has elapsed, whereupon a segment period results where a highest illuminance value is obtained, from a timing of receiving a trigger signal that is in synchronism with the frame, and detects that the light source device is in an abnormal state, when the illuminance value is less than a predetermined threshold.

8 Claims, 9 Drawing Sheets

(52) U.S. Cl.
CPC ......... *H04N 9/3111* (2013.01); *H04N 9/3158* (2013.01); *H04N 9/3161* (2013.01); *H04N 9/3164* (2013.01); *H04N 9/3197* (2013.01)

(58) Field of Classification Search
CPC ... H04N 9/3158; H04N 9/3161; H04N 9/3164
See application file for complete search history.

(56) References Cited

U.S. PATENT DOCUMENTS

| | | | | |
|---|---|---|---|---|
| 2011/0242497 | A1* | 10/2011 | Fukano | G02B 26/008 |
| | | | | 353/31 |
| 2013/0083295 | A1* | 4/2013 | Miyazaki | G02B 27/102 |
| | | | | 353/31 |
| 2013/0242266 | A1* | 9/2013 | Hara | G09G 3/3413 |
| | | | | 353/31 |
| 2016/0316183 | A1* | 10/2016 | Cui | H04N 9/3194 |

FOREIGN PATENT DOCUMENTS

| | | |
|---|---|---|
| JP | 2015-195564 A | 11/2015 |
| JP | 2016-50804 A | 4/2016 |

OTHER PUBLICATIONS

JPO; Application No. 2018-000930; Notice of Reasons for Refusal dated Oct. 22, 2020.

\* cited by examiner

ABNORMALITY DETECTION UNIT, PROJECTOR, ABNORMALITY DETECTION METHOD, AND RECORDING MEDIUM

CROSS-REFERENCE TO RELATED APPLICATION

This application is based upon and claims the benefit of priority under 35 USC 119 from Japanese Patent Application No. 2018-000930 filed on Jan. 9, 2018, the entire disclosure of which, including the description, claims, drawings and abstract, is incorporated herein by reference.

FIELD

The present invention relates to an abnormality detection unit, a projector including a light source unit having the abnormality detection unit, an abnormality detection method, and a recording medium.

BACKGROUND

Data projectors are widely used on many occasions in these days as an image projection system for projecting a screen of a personal computer and video images, as well as images created based on image data recorded on a memory card or the like onto a screen. In these data projectors, light emitted from a light source converges on a micromirror display element called a Digital Micromirror Device (DMD) or a liquid crystal panel to display full color images on a separate screen.

There has been proposed a technique for stopping the drive of a light source in the event that something abnormal occurs in an interior of these projectors. For example, in a projector described in Japanese Patent Laid-Open No. 2013-197807, an output value of an illuminance sensor, which is set on a light source-side optical system in an interior of the projector, is obtained in synchronism with a timing signal of emitting light in the red wavelength range, a timing signal of emitting light in the green wavelength range, and a timing signal of emitting light in the blue wavelength range, and when the output value of the illuminance sensor does not fall within different threshold ranges that are set for the individual colors, determining that something abnormal has occurred in the interior of the projector, the driving of a light source unit is stopped.

SUMMARY

According to an aspect of the invention, there is provided an abnormality detection unit including a processor and a light source device configured to emit light for each of segment periods that are time divided within a frame, wherein the processor obtains an illuminance value of light emitted into the frame from the light source device after a predetermined delay time has elapsed, whereupon a segment period results where a highest illuminance value is obtained, from a timing at which the processor receives a trigger signal that is synchronized with the frame and detects that the light source device is in an abnormal state, when the illuminance value is less than a predetermined threshold.

According to another aspect of the invention, there is provided an abnormality detection method for an abnormality detection unit including a processor and a light emitting device, the abnormality detection method having: a light emitting step of emitting light for each of segment periods that are time divided within a frame from the light emitting device; an illuminance value obtaining step of obtaining an illuminance value of light emitted into the frame from the light emitting device after a predetermined delay time has elapsed, whereupon a segment period results where a highest illuminance value is obtained, from a timing at which a trigger signal is received, the trigger signal being synchronized with the frame; and a detection step of detecting that the light emitting device is in an abnormal state, when the illuminance value obtained in the illuminance value obtaining step is less than a predetermined threshold.

According to a further aspect of the invention, there is provided a recording medium recording in it a program executable by an abnormality detection unit according to the invention which includes a processor and a light emitting device and readable by a computer, the program being configured to realize: a light emitting function of emitting light for each of segment periods that are time divided within a frame from the light emitting device; an illuminance value obtaining function of obtaining an illuminance value of light emitted into the frame from the light emitting device after a predetermined delay time has elapsed, whereupon a segment period results where a highest illuminance value is obtained, from a timing at which a trigger signal is received, the trigger signal being synchronized with the frame; and a detection function of detecting that the light emitting device is in an abnormal state, when the illuminance value obtained by the illuminance value obtaining function is less than a predetermined threshold.

BRIEF DESCRIPTION OF THE DRAWINGS

This patent application will be understood more thoroughly by perusing a detailed description of the invention, which will be made below, together with accompanying drawings.

DETAILED DESCRIPTION

First Embodiment

Figure 1:
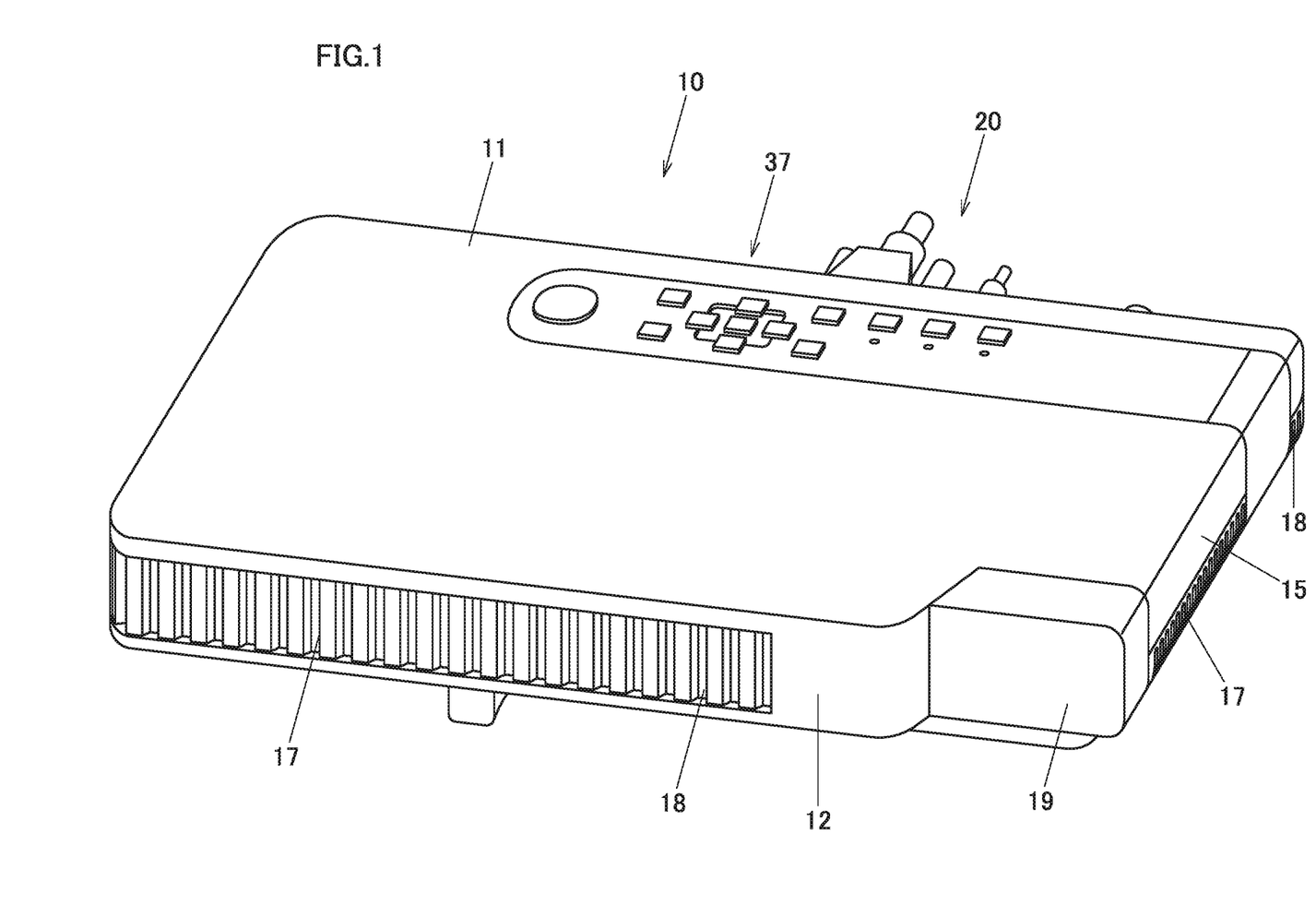
FIG. 1 is an external perspective view of a projector according to a first embodiment of the invention.

Hereinafter, a mode for carrying out the invention will be described. FIG. 1 is an external perspective view of a projector 10 according to a first embodiment of the invention. In the first embodiment, when left and right are referred to in relation to the projector 10, they denote, respectively, left and right directions with respect to a projecting direction of the projector 10. When front and rear are referred to in relation to the projector 10, they denote, respectively, front and rear directions with respect to the direction of a screen and a traveling direction of a pencil of light from the projector 10.

The projector 10 has a substantially rectangular parallelepiped shape as illustrated in FIG. 1. The projector 10 has a lens cover 19 that covers a projection port at a side of a front panel 12, which is a front side panel of a casing of the projector 10. Pluralities of outside air inlet holes 18 and inside air outlet holes 17 are provided in the front panel 12. Further, although not illustrated, the projector 10 includes an Ir reception unit configured to receive a control signal from a remote controller.

A keys/indicators unit 37 is provided on an upper panel 11 of the casing. This keys/indicators unit 37 includes such keys and indicators as a power supply switch key, a power indicator, a projection switch key, an overheat indicator, and the like. The power indicator informs whether a power supply is on or off. The projection switch key switches on or off the projection by the projector 10. The overheat indicator informs of an overheat condition occurring in a light source unit, a display element, a control unit or the like when they really overheat.

Further, an input/output connector unit and various types of terminals 20 such as a power supply adaptor plug and the like are provided on a back panel of the casing, and a USB terminal, a video signal input D-SUB terminal, an S terminal, an RCA terminal and the like are provided in the input/output connector unit. Outside air inlet holes are formed in the back panel. Additionally, inside air outlet holes 17 are formed in each of a right panel, which is a side panel of the casing and is not illustrated in FIG. 1, and a left panel 15, which is also a side panel of the casing and is illustrated in FIG. 1. Further, outside air inlet holes 18 are formed in a corner portion between the left panel 15 and the back panel.

Figure 2:
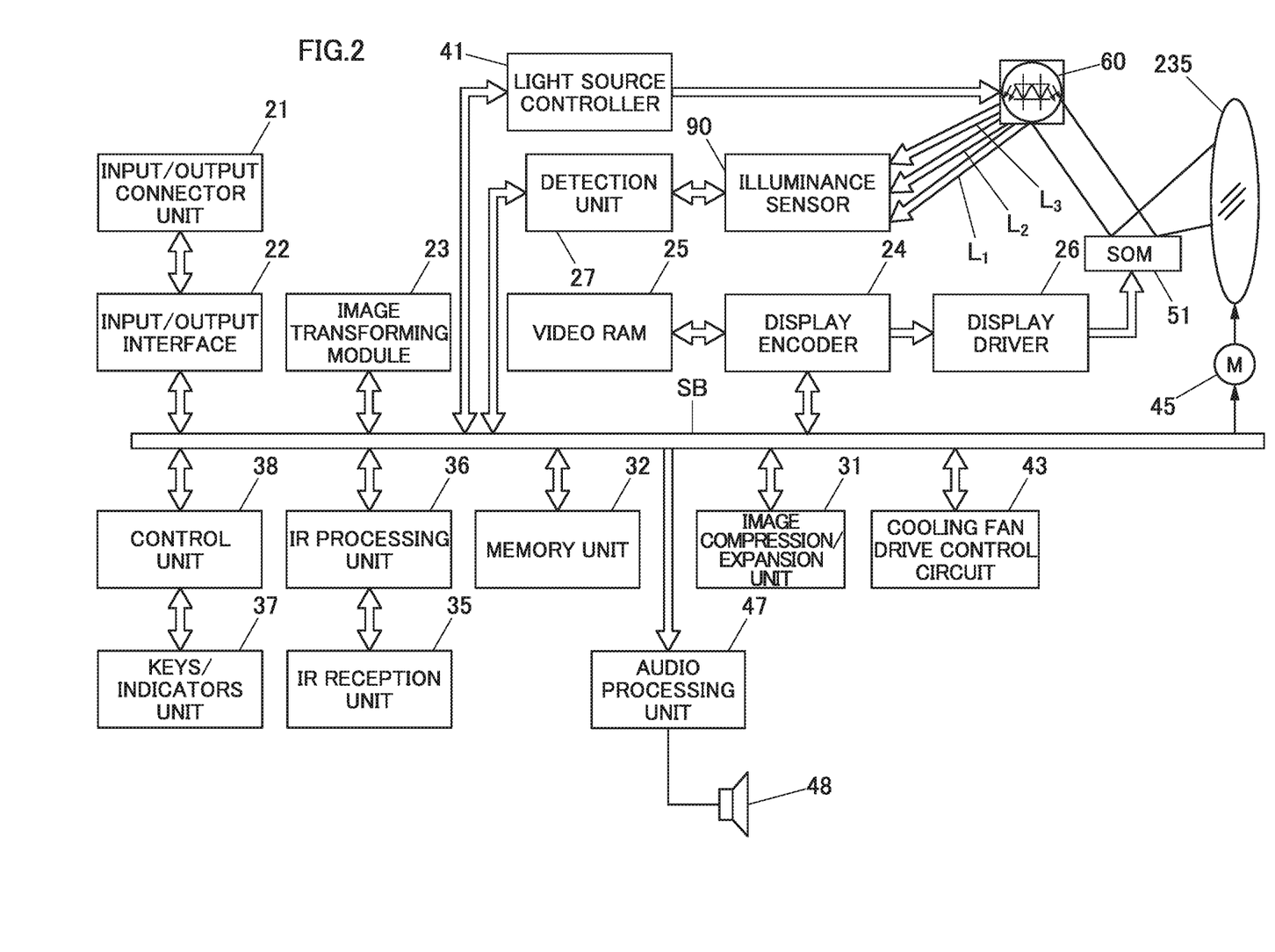
FIG. 2 is a block diagram illustrating functional blocks of the projector according to the first embodiment of the invention.

Next, the projector 10 will be described by the use of FIG. 2 illustrating functional blocks of the projector 10. The projector 10 includes a control unit 38, an input/output interface 22, an image transforming unit 23, a display encoder 24, a display driver 26 and the like. Image signals of various standards which are inputted from the input/output connector unit 21 are sent via the input/output interface 22 and a system bus (SB) to the image transforming unit 23 where the image signals are transformed so as to be unified into an image signal of a predetermined format which is suitable for display. Thereafter, the unified image signal is outputted to the display encoder 24.

The display encoder 24 deploys the inputted image signal on a video RAM 25 for storage in it and generates a video signal from the contents stored in the video RAM 25, outputting the video signal so generated to the display driver 26.

The display driver 26 controls the driving of a display element. The display driver 26 drives a display element 51, which is a spatial optical modulator (SOM), at an appropriate frame rate corresponding to the image signal outputted from the display encoder 24. Then, in the projector 10, pencils of light emitted from a light source unit 60 are shone onto the display element 51 by way of a light guiding optical system. In addition, in the projector 10, an optical image is formed by reflecting the pencils of light shone onto the display element 51, and the image so formed is then projected onto a screen, not illustrated, for display by way of a projection-side optical system, which will be described later. A movable lens group 235 of the projection-side optical system is driven by a lens motor 45 for zooming and focusing.

An image compression/expansion unit 31 performs a recording process in which a luminance signal and a color difference signal of an image signal are data compressed through Adaptive Discrete Cosine Transform (ADCT) and Huffman coding processes, and the compressed data is sequentially written on a memory unit 32 which constitutes a detachable recording medium. With the projector 10 set in a reproducing mode, the image compression/expansion unit 31 reads out the image data recorded in the memory unit 32 and expands the individual image data that make up a series of dynamic images frame by frame. Then, the image compression/expansion unit 31 outputs the image data to the display encoder 24 by way of the image transforming unit 23 so as to enable the display of dynamic images based on the image data stored in the memory unit 32. In addition, the memory unit 32 can also store a program of determining on the abnormality of a light source unit 60 executed by the control unit 38 and a detection unit 27. Due to this, the light source unit 60 functions as an abnormality detection unit.

The control module 38 governs the control of respective operations of circuitries within the projector 10 and is made up of a processor, a ROM that stores operation programs of various types of settings in a fixed fashion, a RAM that is used as a working memory, and the like.

Operation signals generated at the keys/indicators unit 37 that includes the main keys and indicators which are provided on the upper panel 11 of the casing are sent out directly to the control unit 38. Key operation signals from the remote controller are received by the IR reception unit 35 and are then demodulated into a code signal at an IR processing unit 36 for output to the control unit 38.

The control unit 38 is connected to an audio processing unit 47 by way of the system bus (SB). This audio processing unit 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The control unit 38 controls a light source controller 41, which is configured as a light source control unit. The light source controller 41 controls the operation of an excitation light shining device 70 (refer to FIG. 3) separately so that the light source unit 60 can emit light in predetermined wavelength ranges which is necessary in generating an image. Additionally, when instructed by the control unit 38, the light source controller 41 controls a synchronizing timing of a luminescent material laid wheel 101 or the like according to a projection mode.

Further, the control unit 38 causes a cooling fan drive control circuit 43 to detect temperatures through a plurality of temperature sensors which are provided in the light source unit 60 so as to control the revolution speeds of cooling fans based on the results of the temperature detections. Additionally, the control unit 38 also causes the cooling fan drive control circuit 43 to keep the cooling fans rotating by use of a timer or the like even after the power supply to a main body of the projector 10 is switched off. Alternatively, the control unit 38 causes the cooling fan drive control circuit 43 to cut off the power supply to the main body of the projector 10 depending upon the results of the temperature detections by the temperature sensors.

The detection unit 27, which is a detection unit, detects light having a wavelength in the red wavelength range or simply light in the red wavelength range $L_1$, light having a wavelength in the green wavelength range or simply light in the green wavelength range $L_2$, and light having a wavelength in the blue wavelength range or simply light in the blue wavelength range $L_3$ which are emitted from the light source unit 60 to determine whether something abnormal occurs in the light source unit 60.

Figure 3:
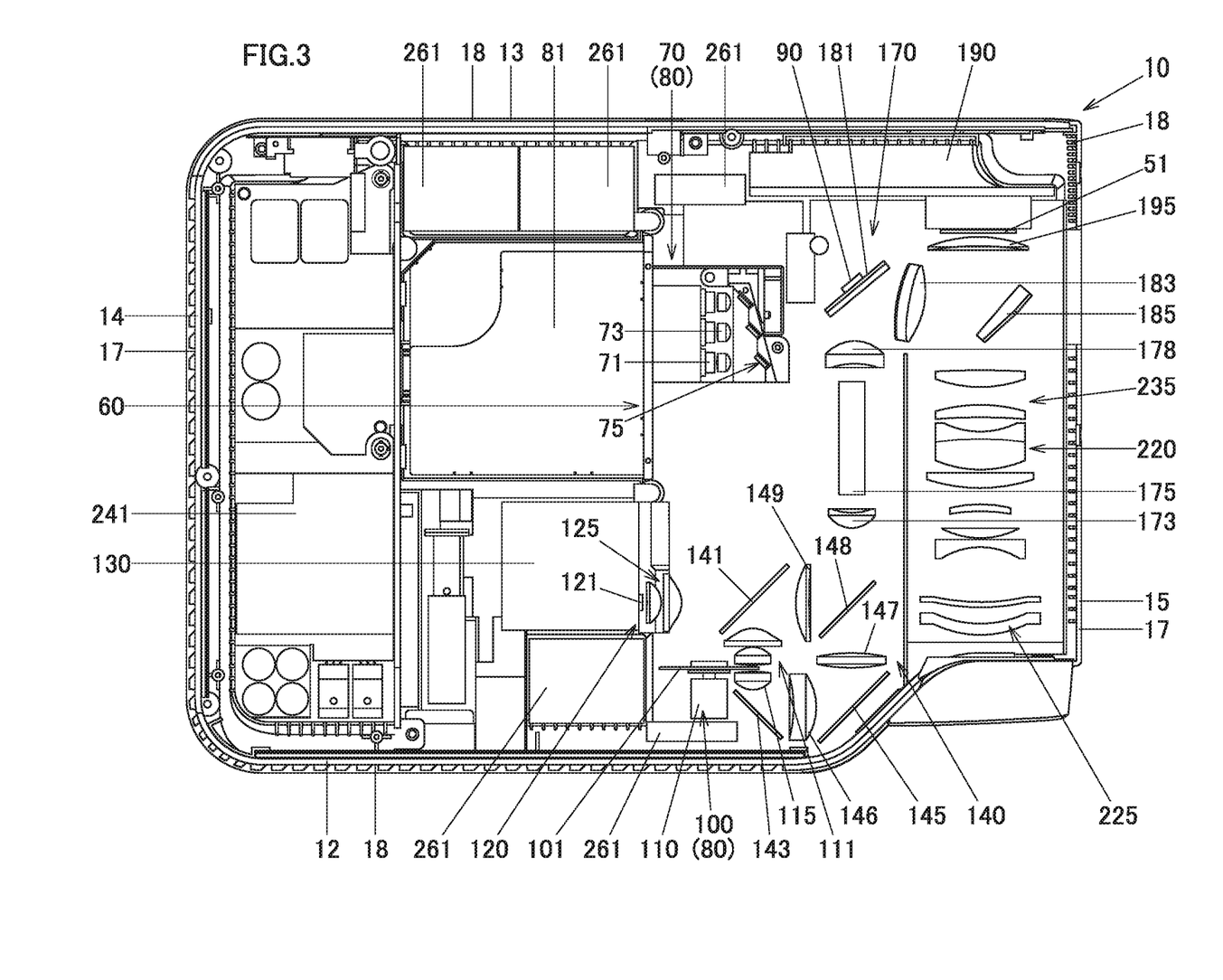
FIG. 3 is a schematic plan view illustrating an internal structure of the projector according to the first embodiment of the invention.

FIG. 3 is a schematic plan view illustrating an internal structure of the projector 10. The projector 10 includes a control circuit board 241 near a right panel 14. This control circuit board 241 includes a power supply circuit block and a light source control block. In addition, the projector 10 includes the light source unit 60 at a substantially central portion of the casing of the projector 10. Further, the projector 10 includes a light source-side optical system 170 and a projection-side optical system 220, which are disposed between the light source unit 60 and the left panel 15.

The light source unit 60 includes light source devices as light emitting devices such as the excitation light shining device 70, a green light source device 80, and a red light source device 120. The green light source device 80 is made up of the excitation light shining device 70 and a luminescent wheel device 100. The excitation light shining device 70 constitutes a blue light source device configured to emit light in the blue wavelength range. The luminescent wheel device 100 emits light in the green wavelength range. The red light source device 120 emits light in the red wavelength range. The light source unit 60 includes a light guiding optical system 140. This light guiding optical system 140 guides and emits light in the red, green and blue wavelength ranges. The light guiding optical system 140 guides light in the red wavelength range, light in the green wavelength range and light in the blue wavelength range which are emitted, respectively, from the excitation light shining device 70, the luminescent wheel device 100 and the red light source device 120 to the light source side optical system 170.

The excitation light shining device 70 is disposed in a position in the casing of the projector 10 which is situated substantially at a center in relation to a left-and-right direction and near the back panel 13. The excitation light shining device 70 includes a light source group which is made up of blue laser diodes 71 (excitation light sources), which are a plurality of semiconductor light emitting devices, disposed so that their optical axes become parallel to the back panel 13, a reflecting mirror group 75 configured to turn axes of light beams emitted from the blue laser diodes 71 through 90 degrees in the direction of the front panel 12, and a heat sink 81 disposed between the blue laser diodes 71 and the right panel 14.

The light source group is formed by arranging the plurality of blue laser diodes 71 into a matrix configuration. In this embodiment, when rows are understood to be aligned in an up-and-down direction in FIG. 3, and columns are understood to be aligned in a vertical direction to a surface of a sheet of paper on which FIG. 3 is drawn, when the excitation light shining device 70 is seen sideways from the left panel 15, a total of 6 blue laser diodes 71 is arranged into a matrix configuration of two rows and three columns.

A plurality of collimator lenses 73 are disposed individually on optical axes of the blue laser diodes 71. The collimator lenses 73 convert light emitted from the corresponding blue laser diodes 71 into parallel light so as to enhance the directivity of the emitted light. The reflecting mirror group 75 is formed by integrating a plurality of reflecting mirrors, which are arranged like steps in a staircase, with corresponding mirror bases. The reflecting mirror group 75 narrows pencils of light emitted from the blue laser diodes 71 in one direction to emit them towards a first dichroic mirror 131.

A cooling fan 261 is disposed between the head sink 81 and the back panel 13, so that the blue laser diodes 71 are cooled by the cooling fan 261 and the heat sink 81. Further, a cooling fan 261 is also disposed between the reflecting mirror group 75 and the back panel 13, so that the reflecting mirror group 75 is cooled by this cooling fan 261.

The luminescent wheel device 100 is disposed on an optical path of excitation light emitted from the excitation light shining device 70 and near the front panel 12. The luminescent wheel device 100 includes the luminescent material laid wheel 101, a motor 110, a collective lens group 111, and a collective lens 115.

The luminescent material laid wheel 101 is disposed so as to be substantially parallel to the front panel 12, that is, so as to be right angles to an axis of light emitted from the excitation light shining device 70. The motor 110 drives rotationally the luminescent material laid wheel 101. The collective lens group 111 collects excitation light emitted from the excitation light shining device 70 to the luminescent material laid wheel 101 and collects luminescent light emitted from the luminescent material laid wheel 101 in the direction of the back panel 13. The collective lens 115 collects luminescent light that the luminescent material laid wheel 101 emits in the direction of the front panel 12. A cooling fan 261 is disposed on a side of the motor 110 that faces the front panel 12, so that the luminescent material laid wheel 101 and the like are cooled by this cooling fan 261.

The luminescent material laid wheel 101 has a substantially circular disc shape. A center shaft of the luminescent material laid wheel 101 is fixed to a shaft section of the motor 110. A base material of the luminescent material laid wheel 101 is formed of metal such as copper, aluminum or the like. A surface of the base material that faces the excitation light shining device 70 constitutes a reflecting surface that is mirror finished through silver deposition or the like. A luminescent light emitting zone configured to emit light in the green wavelength range and a transmission zone configured to pass through light in the blue wavelength range are provided circumferentially in an end-to-end fashion near an outer circumferential edge of the luminescent material laid wheel 101 on a side thereof on which excitation light is incident.

A luminescent material layer of a green luminescent material is formed on the luminescent light emitting zone. The luminescent material layer is formed on the mirror finished reflecting surface of the luminescent body laid wheel 101. The transmission zone is formed into a semi arc shape. The transmission zone is formed, for example, by fitting a transparent base material having a light transmission property in a cut-out formed in an outer circumferential edge portion of the base material of the luminescent material laid wheel 101.

When light in the blue wavelength range emitted from the excitation light shining device 70 is shone onto the luminescent material layer, the luminescent material layer emits luminescent light which is light in the green wavelength range. When light in the blue wavelength range emitted from the excitation light shining device 70 is shone onto the transmission zone, the transmission zone diffuses the light and transmits the diffuse light from a front side towards a rear side of the luminescent material laid wheel 101.

The red light source device 120 includes a red light source 121 and a collective lens group 125. The red light source 121 is disposed so that an optical axis thereof becomes parallel to the blue laser diodes 71, and the collective lens group 125 is configured to collect light emitted from the red light source 121. The red light source 121 is a light emitting diode which is a semiconductor light emitting device that emits light in the red wavelength range. The red light source device 120 is disposed so that an axis of light in the red wavelength range that the red light source device 120 emits intersects an axis of light in the green wavelength range that the luminescent material laid wheel 101 emits. The red light source device 120 includes a heat sink 130 disposed on a side of the red light source 121 that faces the right panel 14. A cooling fan 261 is disposed between this heat sink 130 and the front panel 12, so that the red light source 121 is cooled by this cooling fan 261 and the heat sink 130.

The light guiding optical system 140 is made up of dichroic mirrors (a first dichroic mirror 141, a second dichroic mirror 148), reflecting mirrors (a first reflecting mirror 143, a second reflecting mirror 145), and collective lenses 146, 147, 149. The reflecting mirrors turn axes of pencils of light in the red, green and blue wavelength ranges to align them in the same light axis direction, and the collective lenses 146, 147, 149 collect pencils of light in the red, green and blue wavelength ranges. Hereinafter, these constituent elements of the light guiding optical system 140 will be described.

The first dichroic mirror 141 is disposed in a position lying between the reflecting mirror group 75 and the collective lens group 111. Light in the red wavelength range that the red light source 121 emits passes through the first dichroic mirror 141, and light in the green wavelength range that the luminescent material laid wheel 101 emits is reflected by the first dichroic mirror 141. Thus, the light in the red wavelength range and the light in the green wavelength range travel along the same optical path towards the collective lens 149.

The first reflecting mirror 143 is disposed on an axis of light in the blue wavelength range that passes through the luminescent material laid wheel 101 to be emitted therefrom, that is, between the collective lens 115 and the front panel 12.

The first reflecting mirror 143 reflects light in the blue wavelength range and guides it to the collective lens 146. The collective lens 146 is disposed on a side of the first dichroic mirror 143 that faces the left panel 15. The second reflecting mirror 145 is disposed on a side of the collective lens 146 that faces the left panel 15. The second reflecting mirror 145 turns an axis of the light in the blue wavelength range that is incident thereon from the collective lens 146 through 90 degrees towards the back panel 13.

The collective lens 147 is disposed on a side of the second reflecting mirror 145 that faces the back panel 13. The second dichroic mirror 148 is disposed on a side of the collective lens 149 that faces the left panel 15 and a side of the collective lens 147 that faces the back panel 13. The second dichroic mirror 148 reflects light in the green wavelength range and light in the red wavelength range and passes through light in the blue wavelength range.

Light in the blue wavelength range collected by the collective lens 147 passes through the second dichroic mirror 148 and is collected by a collective lens 173 of the light source-side optical system 170.

The collective lens 149 is disposed on a side of the first dichroic mirror 141 that faces the left panel 15. Light in the green wavelength range that is reflected by the first dichroic mirror 141 and light in the red wavelength range that passes through the first dichroic mirror 141 are guided to the collective lens 149. The light in the green wavelength range and the light in the red wavelength range that are incident on and collected by the collective lens 149 are reflected by the second dichroic mirror 148 and are collected by the collective lens 173 of the light source-side optical system 170. In this way, the light in the red wavelength range, the light in the green wavelength range and the light in the blue wavelength range are guided to the light source-side optical system 170.

The light source-side optical system 170 is made up of the collective lens 173, a light tunnel 175, a collective lens 178, a light axis turn mirror 181, a collective lens 183, a shining mirror 185, a condenser lens 195, and the like. Since the condenser lens 195 emits image light emitted from the display element 51 disposed on a side of the condenser lens 195 that faces the back panel 13 towards the projection-side optical system 220, the condenser lens 195 also makes up part of the projection-side optical system 220.

The collective lens 173 is disposed near an entrance port of the light tunnel 175 and collects light source light. The light in the red, green and blue wavelength ranges collected to the collective lens 173 is emitted towards the light tunnel 175.

The light axis turn mirror 181 is disposed on an optical axis of the light tunnel 175 that extends from the light tunnel 175 towards the back panel 13 in a position lying behind the collective lens 178. Pencils of light emerging from an exit port of the light tunnel 175 are collected by the collective lens 178 and are then turned by the light axis turn mirror 181 so that their axes are directed towards the left panel 15. An illuminance sensor 90, which constitutes an illuminance value obtaining device, is disposed on a rear surface of the light axis turn mirror 181. The illuminance sensor 90 is set in such a position that light leaking from or indirect light of the light guided to and reflected by the light axis turn mirror 181 is incident on the illuminance sensor 90. That is, the illuminance sensor 90 is disposed in such a position that can receive light in the red wavelength range, light in the green wavelength range and light in the blue wavelength range.

The pencils of light reflected on the light axis turn mirror 181 are collected by the collective lens 183 and are then shone on to the display element 51 at a predetermined angle by the shining mirror 185 by way of the condenser lens 195. In this embodiment, a DMD is used as the display element 51. The display element 51 is cooled by a heat sink 190 that is provided on a side thereof that faces the back panel 13.

The pencils of light, which are the light source light shone onto an image forming plane of the display element 51 by the light source-side optical system 170, are reflected on the image forming plane of the display element 51 to be projected on to a screen as projected light by way of the projection-side optical system 220. Here, the projection-side optical system 220 is made up of the condenser lens 195, the movable lens group 235, a fixed lens group 225, and the like. The movable lens group 235 can be moved by the lens motor. Then, the movable lens group 235 and the fixed lens group 225 are incorporated in a fixed lens barrel. Thus, the projection-side optical system 220 including the movable lens group 235 is a variable-focus lens and can be controlled for zooming and focusing.

With the projector 10 that is configured as described heretofore, when the luminescent material laid wheel 101 is rotated, and light is emitted at appropriate timings from the excitation light shining device 70 and the red light source device 120, light in the red wavelength range, light in the green wavelength range and light in the blue wavelength range are incident on the display element 51 by way of the light guiding optical system 140 and the light source-side optical system 170. Due to this, the display element 51 of the projector 10, which is the DMD, displays the red, green and blue light in a time-dividing fashion, whereby a color image can be projected onto a screen.

Figure 4:
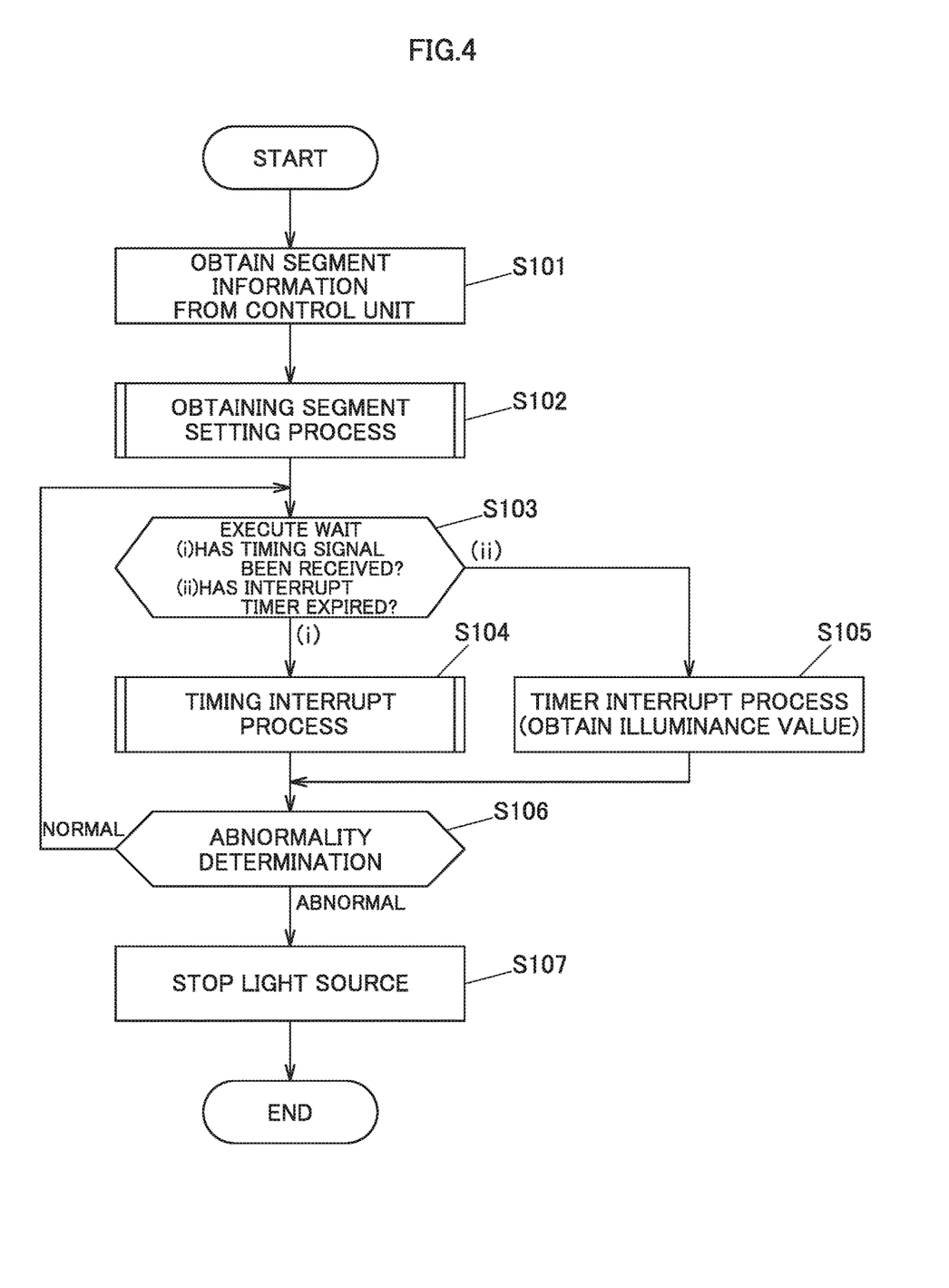
FIG. 4 is a flow chart illustrating a main flow of an abnormality detection performed by a detection unit according to the first embodiment of the invention.
Figure 5:
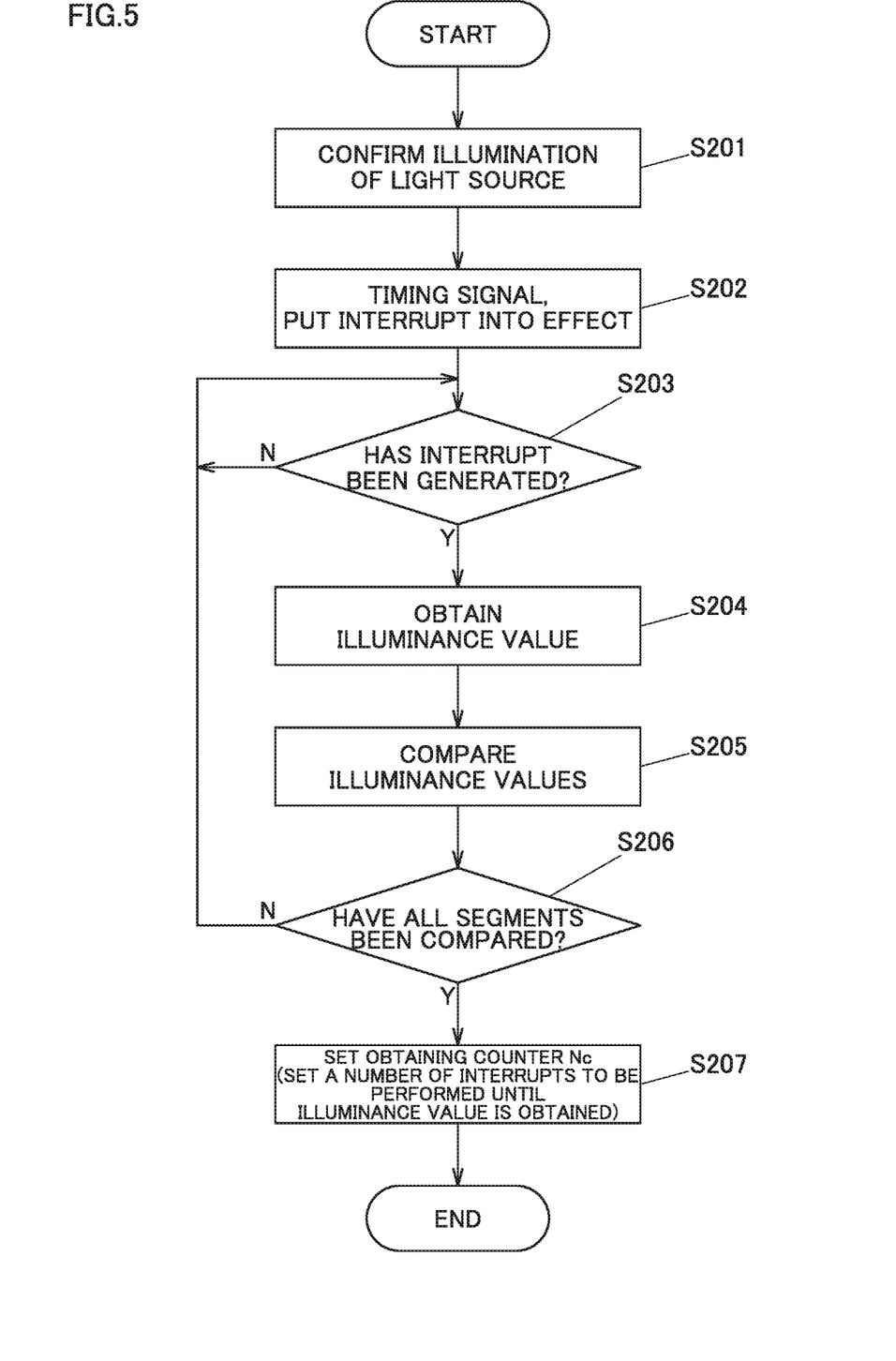
FIG. 5 is a flow chart illustrating an obtaining segment setting process performed by the detection unit according to the first embodiment of the invention.
Figure 6:
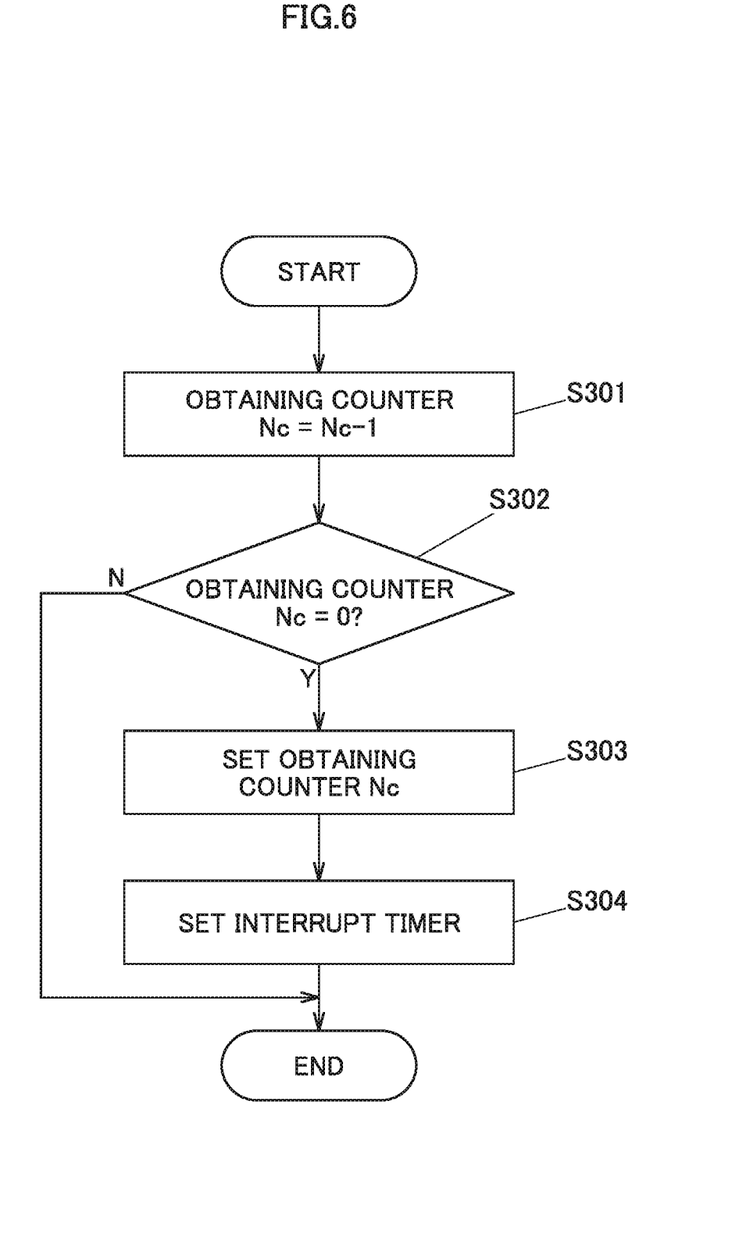
FIG. 6 is a flow chart illustrating a timing interrupt process performed by the detection unit of the first embodiment of the invention.

Next, an abnormality detection method performed by the light source unit 60 will be described. FIG. 4 is a flow chart illustrating a main flow of a determination process performed by the detection unit 27. FIG. 5 is a flow chart illustrating a flow of an obtaining segment setting process (S102) performed by the detection unit 27. FIG. 6 is a flow chart illustrating a flow of a timing interrupt process (S104) performed by the detection unit 27. Hereinafter, the abnormality detection method will be described by reference to a time chart of timing signals that are trigger signals of the projector 10 and outputs of the illuminance sensor 90.

In step S101, the detection unit 27 obtains segment information stored in advance in the memory unit 32 from the control unit 38. Segment information to be obtained includes the number of segments Ns that are time divided within a frame.

Figure 7:
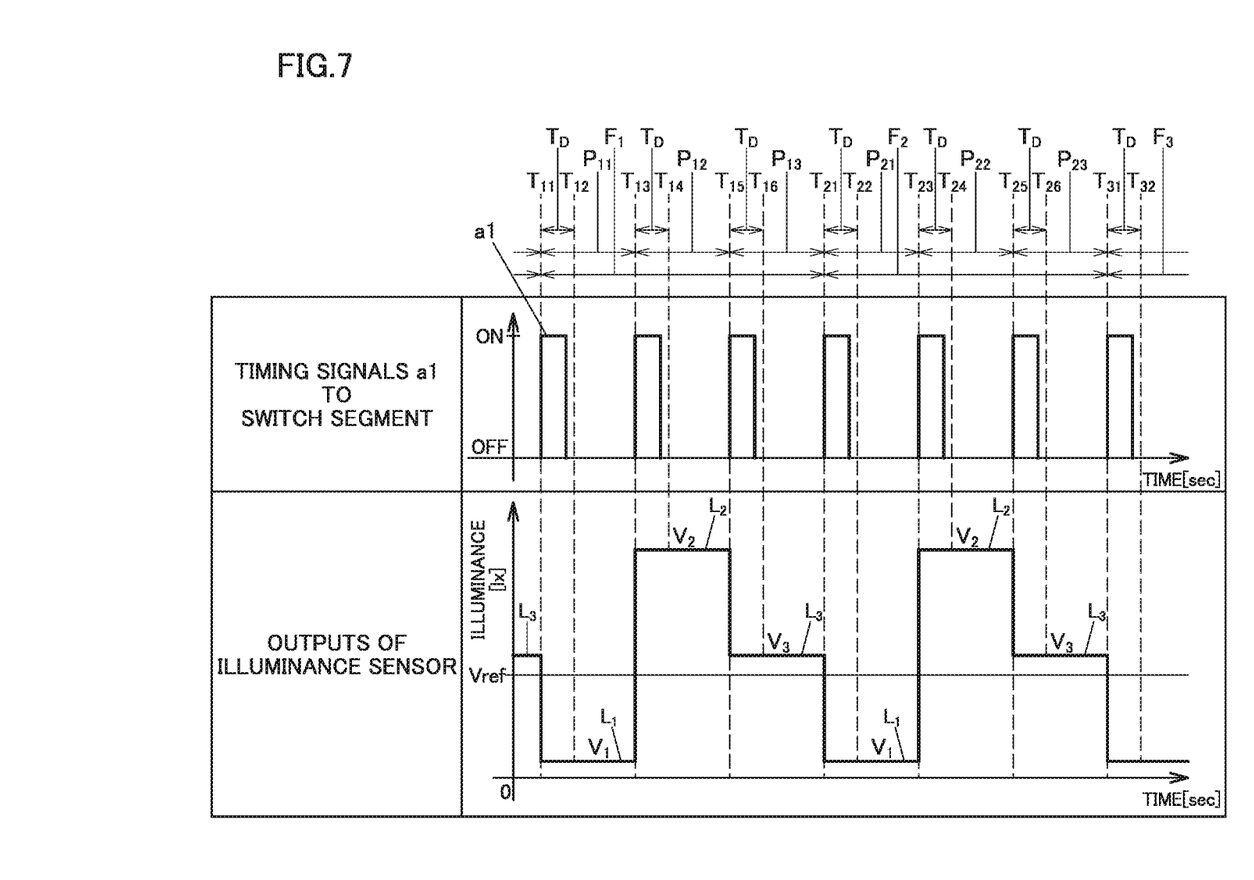
FIG. 7 is a time chart of timing signals of the projector according to the first embodiment of the invention and outputs of an illuminance sensor.

The light source unit 60 of this embodiment emits light in the red wavelength range $L_1$, light in the green wavelength range $L_2$ and light in the blue wavelength range $L_3$ by time dividing one frame $F_1$ into a segment period $P_{11}$ where light in the red wavelength $L_1$ is emitted, a segment period $P_{12}$ where light in the green wavelength range $L_2$ is emitted, and a segment period $P_{13}$ where light in the blue wavelength range $L_3$ is emitted. The light source unit 60 also emits light in the red wavelength range $L_1$, light in the green wavelength range $L_2$ and light in the blue wavelength range $L_3$ sequentially in frames $F_2$, $F_3$ that follow the frame $F_1$ in a similar manner. Light in the red wavelength range $L_1$, light in the green wavelength range $L_2$ and light in the blue wavelength range $L_3$ are emitted as a result of the light source controller 41 directing the light source device (the red light source device 120, the excitation light shining device 70 or the green light source device 80) to emit light when the light source controller 41 receives a pulse-shaped timing signal a1 transmitted from the light source unit 38 to switch the segment periods. Although which of the light in the red, green and blue wavelength ranges is to be emitted is not identified only by the timing signal a1 in this embodiment, the number of segments Ns where the light source unit 60 emits light is determined in advance.

The detection unit 27 obtains "3" as the number of segments Ns in Step S101 since the number of segment periods in each of the frames $F_1, F_2, \ldots, F_n$ is "3."

In Step S102, the detection unit 27 performs an obtaining segment setting process. In Step 201 in FIG. 5, the detection unit 27 confirms based on information that the detection unit 27 receives from the light source controller 41 that the light source device (the red light source device 120, the excitation light shining device 70 or the green light source device 80) of the light source unit 60 is illuminated. In Step S202, the detection unit 27 puts an interrupt process of the timing signal a1 into effect.

In the example of FIG. 7, since light in the blue wavelength range $L_3$ is emitted from the light source device (the excitation light shining device 70) in an initial state where time=0, the detection unit 27 puts the interrupt process of the timing signal a1 into effect in Step S202.

In Step S203, the detection unit 27 determines whether or not an interrupt process is generated as a result of the detection unit 27 receiving the timing signal a1. The timing signal a1 is transmitted simultaneously to the light source controller 41 and the detection unit 27 by the control unit 38. When receiving the timing signal a1 from the control unit 38, the detection unit 27 generates an interrupt process (S203, Y) and performs the interrupt process in Steps S204 to 206. On the other hand, when receiving no timing signal a1 from the control unit 38, the detection unit 27 generates no interrupt process (S203, N) and repeats the determination process in Step 203.

In the example in FIG. 7, the detection unit 27 receives the timing signal a1 at a timing $T_{11}$. Due to this, determining that the interrupt process is generated, the detection unit 27 proceeds to a process in Step S204.

In Step S204, the detection unit 27 obtains an illuminance value using the illuminance sensor 90 after a predetermined delay time $T_D$ elapses from the timing at which the detection unit 27 receives the timing signal a1. The illuminance sensor 90 obtains an illuminance value in synchronism with the rise of the timing signal a1. Since light emitted by the timing signal a1 sometimes becomes unstable initially, the timing at which an illuminance value is obtained is delayed by the delay time $T_D$. The detection unit 27 performs an analog-digital (AD) conversion on the obtained illuminance value and stores the converted illuminance value in the form of a digital value in an internal buffer or the memory unit 32.

In FIG. 7, the detection unit 27 obtains an illuminance value $V_1$ of light in the red wavelength range $L_1$ that is guided within the light source unit 60 from the illuminance sensor 90 at a timing $T_{12}$ that results after the delay time $T_D$ elapses from the timing $T_{11}$. Then, the detection unit 27 stores the obtained illuminance value $V_1$ in the internal buffer or the like.

In Step S205, when the detection unit 27 receives a plurality of illuminance values in Step S204, the detection unit compares the magnitudes of the plurality of illuminance values and obtains a relationship in magnitude between those illuminance values. On the contrary, when receiving no illuminance value to compare, the detection unit 27 proceeds to a process in Step S206 without performing the process in Step S205.

When receiving the illuminance value $V_1$ at the timing $T_{12}$ in FIG. 7, since there is stored no other illuminance value to compare, the detection unit 27 does not perform the process of comparing illuminance values and proceeds to Step S206.

In Step S206, the detection unit 27 determines whether or not illuminance values emitted all the segment periods within one frame have been compared. When the illuminance values emitted in all the segment periods have not yet been compared (S206, N), the detection unit 27 returns to the process in Step S203, whereas when the illuminance values emitted in all the segment periods have been compared (S206, Y), the detection unit 27 proceeds to a process in Step S207.

Since the detection unit 27 obtains only the illuminance value $V_1$ immediately after the timing $T_{12}$ in FIG. 7, the detection unit 27 returns to the process in Step S203. Thereafter, the detection unit 27 obtains a timing signal a1 again at a timing $T_{13}$ (S203, Y) and obtains an illuminance value $V_2$ of light in the green wavelength range $L_2$ at a timing $T_{14}$ (S204). The detection unit 27 compares the illuminance value $V_1$ of the light in the red wavelength range $L_1$ obtained previously with the illuminance value $V_2$ of the light in the green wavelength range $L_2$ obtained currently to obtain a relationship in magnitude between the two illuminance values (S205). However, since the detection unit 27 has not yet compared all the illuminance values in the frame $F_1$ (S206, N), the detection unit 27 returns to the process in Step S203. The detection unit 27 receives a timing signal a1 again at a timing $T_{15}$ (S203, Y) and obtains an illuminance value $V_3$ of light in the blue wavelength range $L_3$ at a timing $T_{16}$ (S204). Thus, since the detection unit 27 can compare now all the illuminance values $V_1$, $V_2$, $V_3$ in the frame $F_1$ to obtain a relationship in magnitude among all the illuminance values in the frame $F_1$ (S205, S206, Y), the detection unit 27 proceeds to the process in Step S207.

In Step S207, the detection unit 27 identifies the light having the highest illuminance value in all the illuminance values compared in Step S206 as a maximum illuminance light for use in abnormality detection. Additionally, the detection unit 27 sets an obtaining counter Nc for counting a segment period where the maximum illuminance light is emitted.

In the example of FIG. 7, the illuminance values $V_1$, $V_2$, $V_3$ get smaller in the order of light in the green wavelength range $L_2$, light in the blue wavelength range $L_3$ and light in the red wavelength range $L_1$. Due to this, the detection unit 27 identifies light in the green wavelength range $L_2$ as the maximum illuminance light. Then, since the segment period $P_{12}$ is the second time period in the frame $F_1$, the detection unit 27 sets the obtaining counter Nc at "2." That is, the value "2" of the obtaining counter Nc set here indicates that when the detection unit 27 receives the timing signal a1 twice since immediately after the timing $T_{16}$ where the illuminance value $V_3$ of the light emitted during the last segment period $P_{13}$ within the frame $F_1$, the detection unit 27 can obtain an illuminance value $V_2$ again at a timing $T_{24}$.

After the process in Step S207, the detection unit 27 proceeds to a process in Step S103.

Returning to FIG. 4, in Step S103, the detection unit 27 waits until (i) the detection unit 27 receives a timing signal a1, or (ii) an interrupt timer expires. When the detection unit 27 receives a timing signal a1 (Step 103, (i)), the detection unit 27 proceeds to a process in Step S104, whereas when the interrupt timer has expired (S103, (ii)), the detection unit 27 proceeds to a process in Step S105. When the detection unit 27 receives no timing signal a1 or the interrupt timer has not yet expired, the detection unit 27 continues to wait.

In FIG. 7, when the detection unit 27 receives a timing signal a1 at a timing $T_{21}$ (S103, (i)), the detection unit 27 proceeds to the process in Step S104.

A timing interrupt process in Step S104 will be performed as follows. Firstly, in Step S301 in FIG. 6, the detection unit 27 performs a process of deducting "1" from the current obtaining counter Nc.

In Step S302, the detection unit 27 determines whether or not the obtaining counter Nc is "0." When determining that the obtaining counter Nc is "0" (S302, Y), the detection unit 27 proceeds to a process in Step S303, whereas when determining that the obtaining counter Nc is not "0" (S302, N), the detection unit 27 ends the flow of processes in FIG. 6.

In Step S303, the detection unit 27 sets the obtaining counter Nc at the value of the number of segments Ns set in Step S101.

In Step S304, the detection unit 27 sets the interrupt timer. A time to be set at the interrupt timer is a delay time ID that is a time elapsing from when the detection unit 27 receives a timing signal a1 until the illuminance sensor 90 obtains an illuminance value and can be stored in the memory unit 32 in advance. When the interrupt time is set, the delay time starts to be counted by a time counter, not shown in FIG. 2 or the like. In this embodiment, the delay time $T_D$ set in Step S304 and the delay time $T_D$ used in Step S204 to obtain the illuminance value are the same.

In the example of FIG. 7, in Step S301 occurring immediately after a timing $T_{21}$, the detection unit 27 performs a process of deducting "1" from "2" in relation to the current obtaining counter Nc set in Step S207. Then, since the current obtaining counter Nc is "1" and is not "0" (S302, N), the detection unit 27 ends the flow of processes in FIG. 6. When ending the flow of processes in FIG. 6, the control unit 27 proceeds to a process in Step S106 in FIG. 4.

In Step S106, the detection unit 27 determines whether or not the illuminance value of the maximum illuminance light obtained in Step S105 is abnormal. When the illuminance value of the maximum illuminance light obtained is a predetermined threshold $V_{ref}$ or greater, the control unit 27 determines that the light source unit 60 is normal (S106, normal), returning to the process in Step S103. When the illuminance value of the maximum illuminance light obtained is less than the predetermined threshold $V_{ref}$, the control unit 27 determines that the light source unit 60 is abnormal (S106, abnormal), proceeding to a process in Step S107. The detection unit 27 can determine that the light source unit 60 is normal also when the maximum illuminance light, which is obtained for determination, is not obtained (S106, normal).

In the example in FIG. 7, since the detection unit 27 does not obtain the illuminance value $V_2$ of the light in the green wavelength range $L_2$, which constitutes the maximum illuminance light, immediately after the control unit 27 receives the timing signal a1 at the timing $T_{21}$, the light source unit 60 is determined to be normal in the determination process in Step S106. Thereafter, when the detection unit 27 receives a timing signal a1 at a timing $T_{23}$ (S103, (i)), the control unit 27 deducts "1" from "1" of the current obtaining counter Nc so that the current obtaining counter Nc becomes "0" (S301). Since the obtaining counter Nc is "0" (S302, Y), the detection unit 27 sets the obtaining counter Nc at "3" which is the number of segments Ns (S303). Thereafter, the detection unit 27 sets the interrupt timer at the delay time $T_D$ (S304) and proceeds to the process in Step S106.

Since the detection unit 27 does not obtain the illuminance value $V_2$ of the light in the green wavelength range $L_2$, which is the maximum illuminance light, here, either, the light source unit 60 is determined to be normal in the determination process in Step S106 (Step S106, normal). Thereafter, since the detection unit 27 obtains the illuminance value $V_2$ of the light in the green wavelength range $L_2$, which is the maximum illuminance light, at a timing $T_{24}$ (S105) since the delay time $T_D$, which is the interrupt timer, elapses then (S103, (ii)).

In Step S106, the detection unit 27 determines that the light source unit 60 is normal (S106, normal) since the illuminance value $V_2$ of the light in the green wavelength range $L_2$, which is the maximum illuminance light, is the threshold $V_{ref}$ or greater. Thus, the detection unit 27 returns to the process in Step S103, and thereafter the detection unit 27 repeats the processes in Steps S103 to S106 when the detection unit 27 receives a timing signal a1 or the interrupt timer expires.

In Step S107, the control unit 27 transmits a light source abnormality determination indication that indicates that the light source unit 60 is abnormal to the control unit 38 illustrated in FIG. 2. Thereafter, the control unit 38 causes the light source controller 41 to stop the operation of the light source unit 60. In Step S107, the control unit 38 and the light source controller 41 function as a light source stop device.

Thus, in the first embodiment, the number of times of performing the interrupt process can be reduced so that the timing signal interrupt process is generated three times and the timer interrupt process is generated once within one frame which is the time period during which the luminescent material laid wheel 101 rotates one rotation, the processing load of the control unit 38, the detection unit 27 and the like can be mitigated.

Second Embodiment

Figure 8:
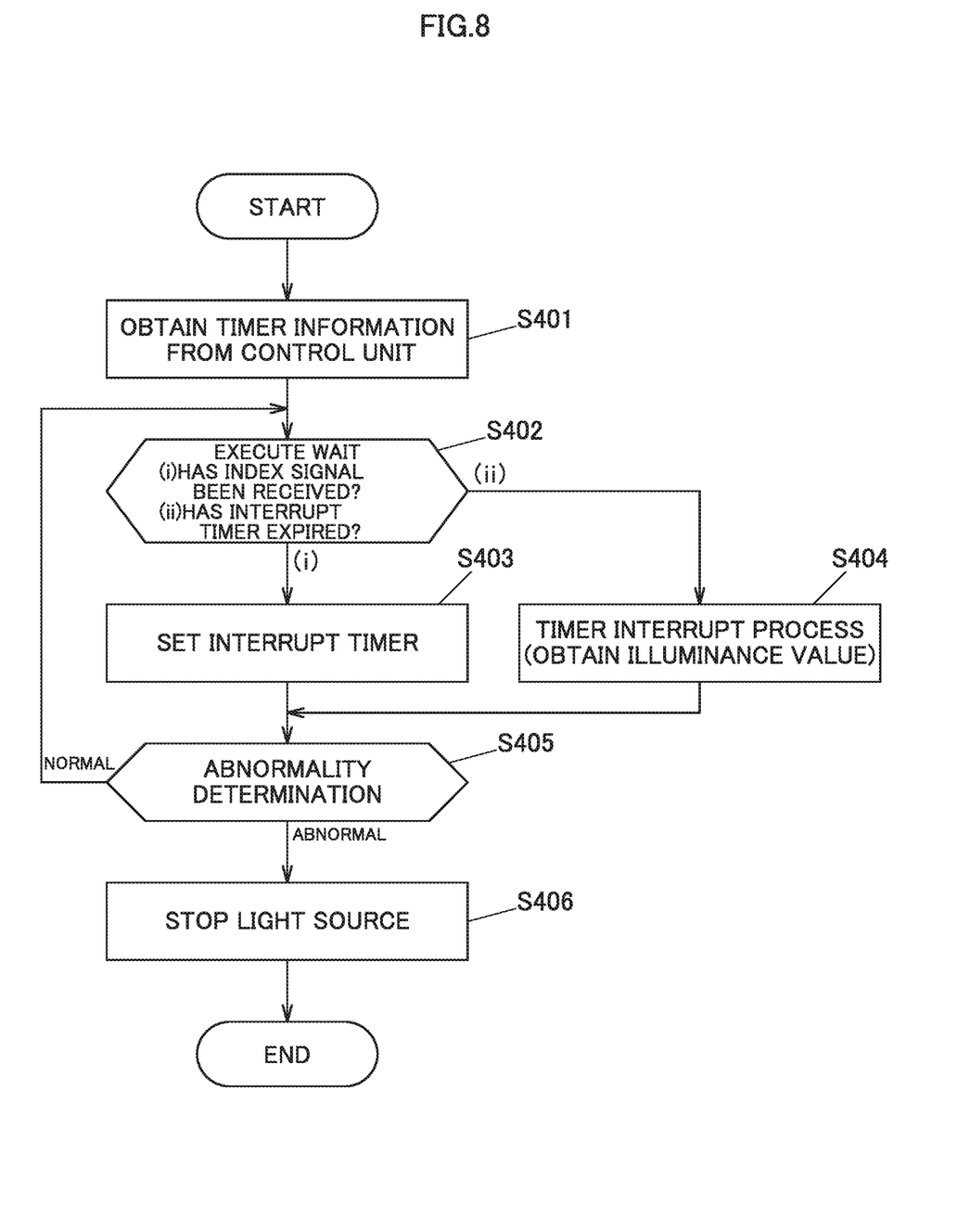
FIG. 8 is a flow chart illustrating a main flow of an abnormality detection performed by a detection unit according to a second embodiment of the invention.
Figure 9:
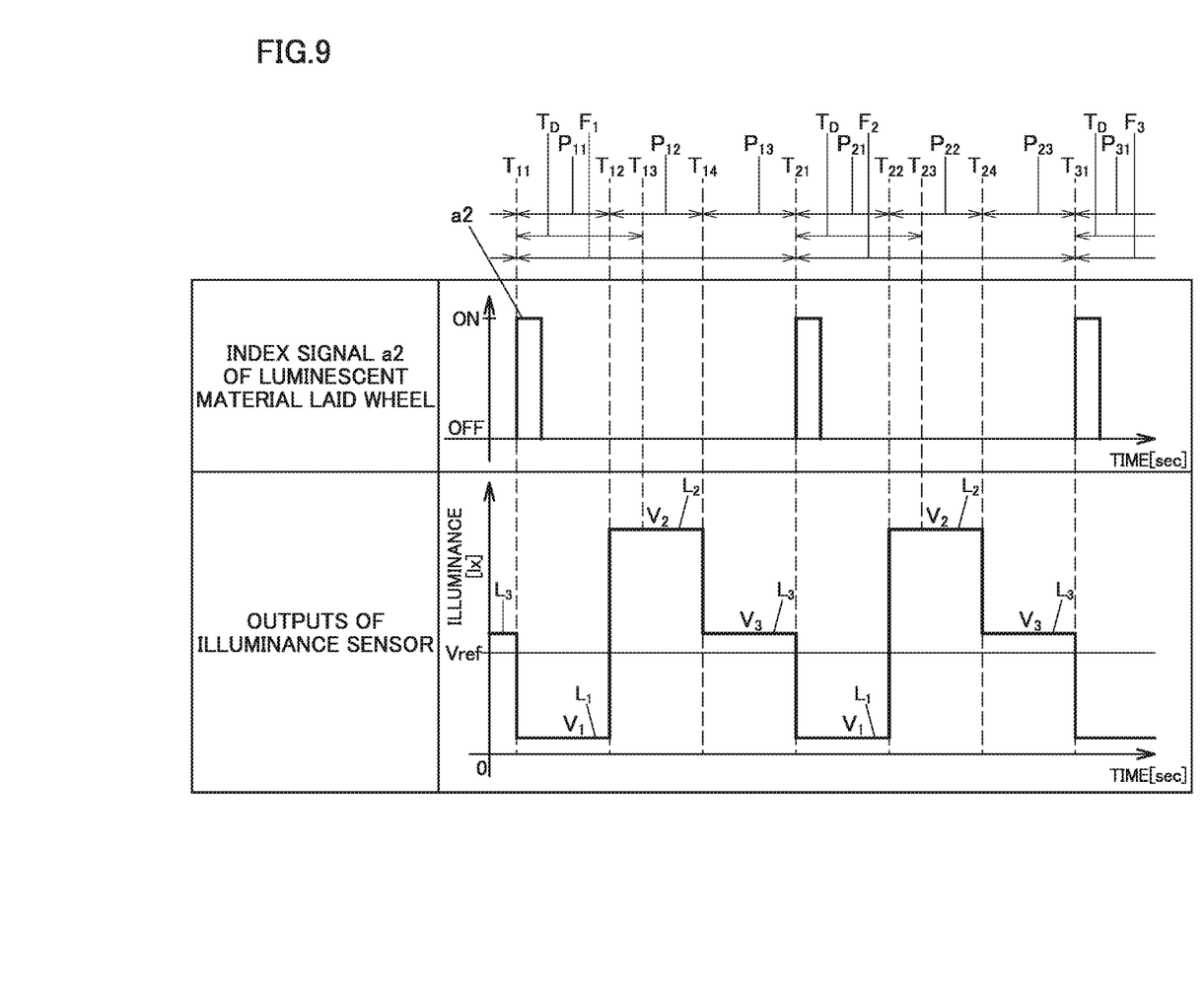
FIG. 9 is a time chart of index signals and outputs of an illuminance sensor of a projector according to the second embodiment of the invention.

Next, a second embodiment will be described. FIG. 8 is a flowchart illustrating a min flow of an abnormality detection performed by a detection unit 27 according to a second embodiment. FIG. 9 is a time chart of index signals a2 that are trigger signals of a projector 10 according to the second embodiment and outputs of an illuminance sensor 90.

In this embodiment, the detection unit 27 detects an index mark (not shown) provided on the luminescent wheel device 100 illustrated in FIG. 3 in place of the timing signal a1 that is transmitted from the control unit 38 and detects an illuminance value of a maximum illuminance light after a predetermined delay time $T_D$ elapses from a timing at which an index signal a2 is received which is inputted from a sensor as a result of the detection of the index mark. In this embodiment, the index mark is a black light absorbing body formed on a lateral surface of a rotational shaft of a luminescent material laid wheel 101 connected to a motor 110. The light absorbing body can be formed by applying paint. The detection unit 27 detects the index mark by use of a reflection optical sensor, not shown, every time the luminescent material laid wheel 101 rotates one rotation. Consequently, a rotation speed of the luminescent material laid wheel 101 and a period of a frame are in synchronism with the index signal a2.

In Step S401 in FIG. 8, the detection unit 27 obtains a delay time $T_D$ via a control unit 38 as timer value information stored in advance in a memory unit 32. The delay time $T_D$ is used to determine a timing at which the detection unit 27 detects an illuminance in a subsequent step S402.

In Step S402, the detection unit 27 determines whether or not (i) the detection unit 27 receives an index signal a2 or (ii) an interrupt timer expires. When receiving an index signal a2 by use of the optical sensor (S402, (i)), the control unit 27 proceeds to a process in Step S403, whereas when the interrupt timer expired (S402, (ii)), the detection unit 27 proceeds to a process in Step S404.

In Step S403, the control unit 27 sets the delay time $T_D$ obtained in Step S401 as an interrupt timer.

On the other hand, in Step S404, the control unit 27 obtains an illuminance value of a maximum illuminance light from the illuminance sensor 90 after the delay time $T_D$ elapses from the timing at which the detection unit 27 receives the index signal a2. The illuminance value obtained is then stored in an internal buffer of the detection unit 27.

In Step S405, the detection unit 27 determines whether or not the illuminance value of the maximum illuminance light obtained is abnormal. The determination as to whether or not it is abnormal can be performed in a similar manner as in the first embodiment. That is, the detection unit 27 determines that a light source unit 60 is normal when the illuminance value obtained in Step S404 is a threshold $V_{ref}$ or greater, whereas when the illuminance value is less than the threshold $V_{ref}$, the detection unit 27 determines that the light source unit 60 is abnormal. When determining that the illuminance value is normal, the control unit 27 returns to the process in Step S403, whereas when determining that the illuminance value is abnormal, the detection unit 27 proceeds to a process in Step S406. When the detection unit 27 does not obtain the illuminance value that is determined to be abnormal in Step S405, the detection unit 27 determines that the obtained illuminance value is normal (S405, normal) and returns to the process in Step S402.

In an example in FIG. 9, since the detection unit 27 firstly receives an index signal a2 at a timing $T_{11}$ (S402, (i)), the detection unit 27 sets the delay time $T_D$ as an interrupt timer (S403). Since the detection unit 27 does not obtain an illuminance value that is determined to be abnormal at this point in time, the detection unit 27 determines that the light source unit 60 is normal (S405, normal) and returns to the process in Step S402.

Thereafter, when the interrupt timer is expired (S402, (ii)), the detection unit 27 obtains an illuminance value from the illuminance sensor 90 at a timing $T_{13}$ which is a point in time at which the delay time $T_D$ elapses from when the detection unit 27 receives the index signal a2. In this embodiment, the detection unit 27 obtains an illuminance value $V_2$ of light in the green wavelength range $L_2$, which is a maximum illuminance light, at a segment period $P_{12}$ of a frame $F_1$.

As illustrated in FIG. 9, since the obtained illuminance value $V_2$ is the threshold $V_{ref}$ or greater, the detection unit 27 determines that the light source unit 60 is normal (S405, normal) and repeats the processes in Steps S402 to S405.

In Step S406, as with Step S107, the control unit 27 transmits an abnormality determination result indicating that the light source unit 60 is abnormal to the control unit 38, whereby the control unit 38 causes a light source controller 41 to stop the operation of the light source unit 60. In Step S406, the control unit 38 and the light source controller 41 function as a light source stopping device.

Thus, in the second embodiment, the number of interrupt processes can be reduced to a total of two interrupt processes of one interrupt process based on the index signal a2 and one interrupt process based on the interrupt timer every time the wheel rotates one rotation. In addition, even though the number of segments Ns that are divided within the frame is increased, since the number of interrupt processes is not increased, the processing load of the detection unit 27 and the like is not advantageously affected. For example, with four segments being provided within the frame, when an illuminance value is obtained every time the timing signal a1 is received, a total of eight interrupt processes is generated. However, with the abnormality detection method of this embodiment, even with three segments or four segments being provided within the frame, the number of interrupt processes can be reduced to the total of two interrupt processes by the index signal a2.

The index mark may be a notch or through hole provided in the luminescent wheel device 100. As this occurs, the reflection optical sensor or a transmission optical sensor can be used as the optical sensor.

The illuminance sensor 90 may be disposed in a position where light in the red wavelength range is not received.

The light source unit 60 that has been described heretofore includes a light source device configured to emit light in segment periods that are time divided within a frame, an illuminance value obtaining unit configured to obtain an illuminance value of a maximum illuminance light that is emitted into the frame by the light source device after a predetermined delay time $T_D$ has elapsed, whereupon a segment period results where a highest illuminance value is obtained, from a timing at which a trigger signal is received which is in synchronism with the frame, and a detection unit configured to detect that the light source device is abnormal when the illuminance value obtained by the illuminance obtaining unit is less than a predetermined threshold $V_{ref}$. This can provide an abnormality detection unit, a projector 10, an abnormality detection method and a recording medium that can detect the abnormality of the light source with a low load by performing an interrupt process a relatively small number of times within one frame.

With the abnormality detection unit in which the trigger signal is a timing signal a1 that is transmitted a plurality of times within the frame, and the illuminance value obtaining unit obtains an illuminance value of an highest illuminance value light after the delay time $T_D$ has elapsed from a timing at which the illuminance value obtaining unit receives a timing signal a1 that switches the segment periods to a segment period where the highest illuminance value light is emitted, the illuminance value can be obtained in synchronism with the switching of the segment periods without transmitting an exclusive trigger signal separately.

With the abnormality detection unit in which the illuminance value obtaining unit compares the illuminance values of all the light emitted at the segment periods within the frame to obtain an obtaining counter Nc that identifies a trigger signal for emitting the highest illuminance value light, the timing can automatically be obtained at which the illuminance value for execution of the abnormality determination is obtained.

With the abnormality detection unit in which the illuminance value obtaining unit counts the obtaining counter Nc every time the trigger signal is received in the frame, and the illuminance value obtaining unit obtains an illuminance value by determining that the segment period results where the highest illuminance value light is emitted when the value of the obtaining counter Nc expires, the segment period can automatically be determined where the illuminance value is obtained.

With the abnormality detection unit in which the light source device includes a luminescent material laid wheel 101 configured to be driven to rotate in synchronism with a period of the frame, and the trigger signal is an index signal a2 that is outputted as a result of a sensor detecting an index mark formed on the luminescent material laid wheel 101 or a rotational shaft of the luminescent material laid wheel 101, the performance of an interrupt process in the frame can be limited to the reception of the index signal a2 and the expiring of an interrupt timer, whereby the number of times of performing the interrupt process within the frame can be reduced to a small number of times.

With the light source unit 60 in which the index mark is a light absorbing body formed on a lateral surface of the rotational shaft, and the detection unit detects the light absorbing body by use of an optical sensor, the illuminance value can be obtained in synchronism with the switching of the segment periods by a simple and easy method.

With the abnormality detection unit including further a light source stop unit configured to stop the driving of the light source device when the detection unit determines that the light source device is abnormal, the light source unit 60 can be prevented from being used in an unintended manner, thereby making it possible to improve the safety of the projector 10.

While the embodiments of the invention have been described heretofore, the embodiments are presented as examples, and hence, there is no intention to limit the scope of the invention by the embodiments. These novel embodiments can be carried out in other various forms, and various omissions, replacements and modifications can be made to the embodiments without departing from the spirit and scope of the invention. Those resulting embodiments and their modifications are included in the spirit and scope of the invention and are also included in the scope of inventions claimed for patent under claims below and their equivalents.

What is claimed is:

1. An abnormality detection unit comprising:
   a processor; and
   a light source device configured to emit light for each of segment periods that are time divided within a frame,
   wherein the light source device comprises a luminescent material laid wheel configured to be driven to rotate,
   wherein the processor
   obtains an illuminance value of light emitted into the frame from the light source device after a predetermined delay time has elapsed, whereupon a segment period results where a highest illuminance value is obtained, from a timing of receiving a trigger signal, the trigger signal being in synchronism with the frame, and
   detects that the light source device is in an abnormal state, when the illuminance value is less than a predetermined threshold, and
   wherein the trigger signal is an index signal outputted as a result of a sensor detecting an index mark formed on the luminescent material laid wheel or a rotational shaft of the luminescent material laid wheel, and
   wherein the processor, in advance, obtains the illuminance values of all lights that are emitted at the segment periods in the frame to compare the illuminance values obtained, identifies a timing causing a highest illuminance value light to be emitted from a result of the comparison, and sets a counter for measuring the delay time based on a result of the identification.

2. The abnormality detection unit according to claim 1, the processor counts the counter for measuring every time the trigger signal is received in the frame, and obtains the illuminance value by determining that the segment period where a highest illuminance value light is emitted results when a value of the counter for measuring expires.

3. The abnormality detection unit according to claim 1, comprising:
   an optical sensor configured to detect a light absorbing body,
   wherein the index mark is a light absorbing body formed on a lateral surface of the rotational shaft, and
   wherein the processor detects the light absorbing body by use of the optical sensor.

4. The abnormality detection unit according to claim 1, wherein the processor stops the light source device from being driven when the light source device is determined to be abnormal.

5. A projector comprising:
   the abnormality detection unit according to claim 1;
   a display element onto which light source light is shone from the light source device to thereby form image light; and
   a projection-side optical system configured to project the image light emitted from the display element onto a screen,
   wherein the processor controls the display element and the abnormality detection unit.

6. The abnormality detection unit according to claim 1, wherein one rotation period of the luminescent material laid wheel is set to one frame.

7. An abnormality detection method for an abnormality detection unit comprising a light emitting device, the abnormality detection method comprising:

a light emitting step of emitting light for each of segment periods that are time divided within a frame from the light emitting device;

an illuminance value obtaining step of obtaining an illuminance value of light emitted into the frame from the light emitting device after a predetermined delay time has elapsed, whereupon a segment period results where a highest illuminance value is obtained, from a timing of receiving a trigger signal, the trigger signal being in synchronism with the frame;

a detection step of detecting that the light emitting device is in an abnormal state, when the illuminance value obtained in the illuminance value obtaining step is less than a predetermined threshold, and a setting step of, prior to the illuminance value obtaining step, obtaining the illuminance values of all lights that are emitted at the segment periods in the frame to compare the illuminance values obtained, identifying a timing causing a highest illuminance value light to be emitted from a result of the comparison, and setting a counter for measuring the delay time based on a result of the identification, wherein the light source device comprises a luminescent material laid wheel configured to be driven to rotate, and wherein the trigger signal is an index signal outputted as a result of a sensor detecting an index mark formed on the luminescent material laid wheel or a rotational shaft of the luminescent material laid wheel.

8. A recording medium recording in it a program executable by an abnormality detection unit which includes a light emitting device comprising a light emitting device and readable by a computer, the program being configured to realize:

a light emitting function of emitting light for each of segment periods that are time divided within a frame from the light emitting device;

an illuminance value obtaining function of obtaining an illuminance value of light emitted into the frame from the light emitting device after a predetermined delay time has elapsed, whereupon a segment period results where a highest illuminance value is obtained, from a timing of receiving a trigger signal, the trigger signal being in synchronism with the frame;

a detection function of detecting that the light emitting device is in an abnormal state, when the illuminance value obtained by the illuminance value obtaining function is less than a predetermined threshold; and a setting function of, in advance, obtaining the illuminance values of all lights that are emitted at the segment periods in the frame to compare the illuminance values obtained, identifying a timing causing a highest illuminance value light to be emitted from a result of the comparison, and setting a counter for measuring the delay time based on a result of the identification, wherein the light source device comprises a luminescent material laid wheel configured to be driven to rotate, and wherein the trigger signal is an index signal outputted as a result of a sensor detecting an index mark formed on the luminescent material laid wheel or a rotational shaft of the luminescent material laid wheel.

\* \* \* \* \*